(12) United States Patent
Harrison et al.

(10) Patent No.: US 8,708,346 B2
(45) Date of Patent: Apr. 29, 2014

(54) ROTARY TOOL INCLUDING A COLLET

(75) Inventors: Ryan Harrison, Anderson, SC (US); Robert E. McCracken, Anderson, SC (US); Daniel J. Bowen, Aiken, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 1115 days.

(21) Appl. No.: 12/684,618

(22) Filed: Jan. 8, 2010

(65) Prior Publication Data

US 2011/0170975 A1 Jul. 14, 2011

(51) Int. Cl.
*B23B 31/12* (2006.01)

(52) U.S. Cl.
USPC .............................. 279/75; 279/902; 279/60

(58) Field of Classification Search
USPC ............... 279/22, 28, 29, 30, 33, 72, 75, 102, 279/103, 137, 128, 155, 24, 903, 52, 56, 279/60–62, 902
See application file for complete search history.

(56) References Cited

U.S. PATENT DOCUMENTS

| 220,654 | A | * | 10/1879 | Payton | 100/293 |
| 258,135 | A | * | 5/1882 | Schmucker | 248/337 |
| 893,958 | A | * | 7/1908 | Weaver | 279/72 |
| 973,345 | A | * | 10/1910 | Dalton | 279/72 |
| 1,068,263 | A | * | 7/1913 | Monaghan | 279/72 |
| 1,288,324 | A | * | 12/1918 | Weir | 279/64 |
| 1,426,704 | A | * | 8/1922 | Axelsson | 279/69 |
| 1,898,726 | A | * | 2/1933 | Hess | 81/53.2 |
| 1,979,652 | A | * | 11/1934 | Taylor | 279/61 |
| 2,063,344 | A | | 12/1936 | Schneider | |
| 2,063,433 | A | * | 12/1936 | Grenat | 261/53 |
| 2,394,555 | A | * | 2/1946 | Mann | 279/65 |
| 2,498,525 | A | | 2/1950 | Bracker | |
| 2,539,045 | A | | 1/1951 | Waring | |
| 2,603,496 | A | | 7/1952 | Richert | |
| 2,613,942 | A | | 10/1952 | Saunders | |
| 2,811,366 | A | * | 10/1957 | Chasar | 279/123 |
| 2,874,985 | A | * | 2/1959 | March | 403/258 |
| 3,007,504 | A | | 11/1961 | Clark | |
| 3,558,146 | A | * | 1/1971 | Mayers et al. | 279/28 |
| 4,266,789 | A | * | 5/1981 | Wahl et al. | 279/60 |
| 4,767,077 | A | | 8/1988 | Kataoka | |
| 5,193,824 | A | * | 3/1993 | Salpaka | 279/60 |
| 5,195,761 | A | * | 3/1993 | Eimer | 279/90 |
| 5,271,135 | A | * | 12/1993 | Shifferly | 407/29.15 |
| 5,340,128 | A | * | 8/1994 | Weiss et al. | 279/60 |
| 5,354,075 | A | | 10/1994 | Marik et al. | |

(Continued)

FOREIGN PATENT DOCUMENTS

DE 3501870 A * 7/1986
DE 3604927 A1 * 8/1987

*Primary Examiner* — Eric A Gates
*Assistant Examiner* — Paul M Janeski
(74) *Attorney, Agent, or Firm* — Michael Best & Friedrich LLP

(57) ABSTRACT

A collet for connecting a rotary tool to a rotary tool driver, the rotary tool including a shaft having a shaft end and a shaft diameter includes a body including a first end configured to connect to the rotary tool driver and a second end configured to receive the rotary tool. A magnet is disposed within the body and is positioned to magnetically engage and contact the shaft end to inhibit movement of the rotary tool along a shaft rotational axis. A support member is disposed within the body and is configured to support the shaft for rotation about the shaft rotational axis.

15 Claims, 9 Drawing Sheets

(56) References Cited

U.S. PATENT DOCUMENTS

| | | | |
|---|---|---|---|
| 5,464,229 A | 11/1995 | Salpaka | |
| 5,577,743 A | 11/1996 | Kanaan et al. | |
| 5,755,448 A | 5/1998 | Kanaan et al. | |
| 6,241,260 B1 * | 6/2001 | Judge et al. | 279/64 |
| 6,261,035 B1 * | 7/2001 | Moores et al. | 408/239 R |
| 6,343,901 B2 | 2/2002 | Wheeler et al. | |
| 6,457,916 B2 | 10/2002 | Wienhold | |
| 6,561,523 B1 | 5/2003 | Wienhold | |
| 6,688,611 B2 | 2/2004 | Gifford et al. | |
| 6,843,484 B2 * | 1/2005 | Schroeder | 279/60 |
| 7,325,811 B2 | 2/2008 | Hartmann et al. | |
| 2002/0135140 A1 * | 9/2002 | Mitchell et al. | 279/79 |
| 2004/0007437 A1 | 1/2004 | Linzell | |
| 2005/0023774 A1 * | 2/2005 | Mack | 279/60 |
| 2007/0176374 A1 * | 8/2007 | Cachod | 279/62 |
| 2008/0217870 A1 | 9/2008 | Shibata | |

\* cited by examiner

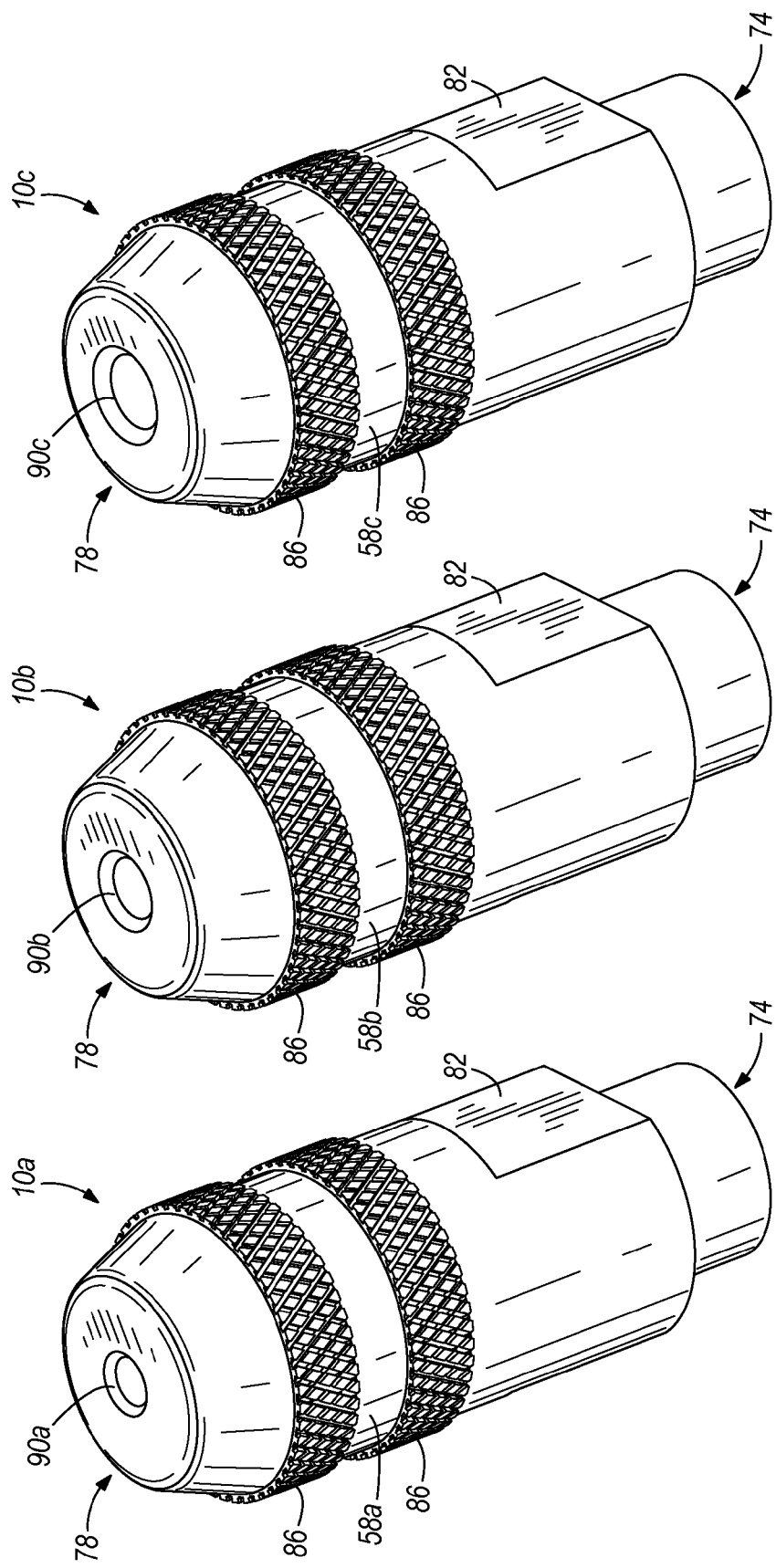

ROTARY TOOL INCLUDING A COLLET

BACKGROUND

The present invention relates to a rotary tool for mounting tool bits and bit replacements on rotatable drives such as drills, power screwdrivers, and other power tools. More particularly, the present invention relates to a quick connect collet that attaches tool bits and the like to rotatable drives without the need for tools.

SUMMARY

In one embodiment, the invention provides a collet for connecting a rotary tool to a rotary tool driver. The rotary tool includes a shaft having a shaft end and a shaft diameter. The collet includes a body including a first end configured to connect to the rotary tool driver and a second end configured to receive the rotary tool. A magnet is disposed within the body and is positioned to magnetically engage and contact the shaft end to inhibit movement of the rotary tool along a shaft rotational axis. A support member is disposed within the body and is configured to support the shaft for rotation about the shaft rotational axis.

In another embodiment, the invention provides a collet for connecting a rotary tool to a rotary tool driver. The rotary tool includes a shaft having a shaft end and a shaft diameter. The collet includes a body including flats configured for engagement with a hand tool and knurled regions configured to improve a users grip. The body also includes a first end that includes threads that threadably engage a threaded shaft of the rotary tool driver, and a second end that includes an aperture having a diameter that is about the same as the shaft diameter such that the shaft fits within the aperture. A magnet is disposed within the body and is positioned to magnetically engage and contact the shaft end to inhibit movement of the rotary tool along a shaft rotational axis. The magnet used in this embodiment is a rare earth magnet. A support member includes a one-way roller bearing that defines a bearing inside diameter that is about the same as the shaft diameter such that the shaft fits within the inside diameter and is disposed within the body. The bearing is configured to support the shaft for rotation about the shaft rotational axis.

In another embodiment, the invention provides a rotary tool operable to drive a plurality of rotary tools. Each rotary tool includes a tool shaft having a tool end and a shaft diameter. The rotary tool includes a housing including a driving end. A motor is supported within the housing and is operable to drive a shaft having a shaft end. A plurality of collets are each selectively connectable to the shaft end. Each of the plurality of collets includes a collet body including a first end threadably connected to the shaft end and a second end including an aperture sized to receive the rotary tool shaft. A magnet is disposed within the collet body and is positioned to magnetically engage and contact the tool end to inhibit movement of the rotary tool along a tool shaft rotational axis. A support member is disposed within the collet body and is configured to support the tool shaft for rotation about the rotational axis.

In another embodiment, the invention provides a collet for connecting a rotary tool to a rotary tool driver. The rotary tool includes a shaft having a shaft end and a shaft diameter. The collet includes a body including a first end that includes threads that threadably engage a threaded shaft of the rotary tool driver, and a second end that includes three semi-circular indents forming an aperture. A magnet is disposed within the body and is positioned to magnetically engage and contact the shaft end to inhibit movement of the rotary tool along a shaft rotational axis. The magnet used in this embodiment is a rare earth magnet. A shaft support member for this embodiment includes a spring, a spacer and a jaw and locking roller bearing assembly. The jaw and locking roller bearing assembly defines a bearing inside diameter that is about the same size in diameter as the shaft diameter, such that the shaft fits within the inside diameter and is disposed within the body. The jaw and locking roller bearing assembly is configured to support the shaft for rotation about the shaft rotational axis.

In another embodiment, the invention provides a collet and nose-cap assembly for connecting a rotary tool to a rotary tool driver. The rotary tool includes a shaft having a shaft end and a shaft diameter. The collet and nose-cap assembly are adjustably fixed to the rotary tool driver. The collet and nose-cap assembly includes a collet body having a first end with castellated features configured for integrating with the nose-cap's recessed mating features, and a second end having an aperture for receiving a rotary tool's shaft. The rotary tool driver includes a shaft with a threaded portion that extends through the nose-cap and connects to the collet body. The collet body has a set of jaws that are pressed upon by the rotary tool driver shaft to secure the rotary tool shaft. The rotary tool shaft is secured by the set of jaws. The collet body mates with the nose-cap and the nose-cap is tightened onto the rotary tool driver shaft securing the rotary tool shaft within the set of jaws. The nose-cap has a body that has gripping sections to ease the tightening process without a tool.

Other features and advantages of the invention will become apparent to those skilled in the art upon review of the following detailed description, claims, and drawings.

BRIEF DESCRIPTION OF THE DRAWINGS

FIG. 3 is a perspective view of the collet of FIG. 1 having a first aperture diameter;

FIG. 4 is a perspective view of the collet of FIG. 1 having a second aperture diameter;

FIG. 5 is a perspective view of the collet of FIG. 1 having a third aperture diameter;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The order of limitations specified in any method claims does not imply that the steps or acts set forth therein must be performed in that order, unless an order is explicitly set forth in the specification.

Figure 1:
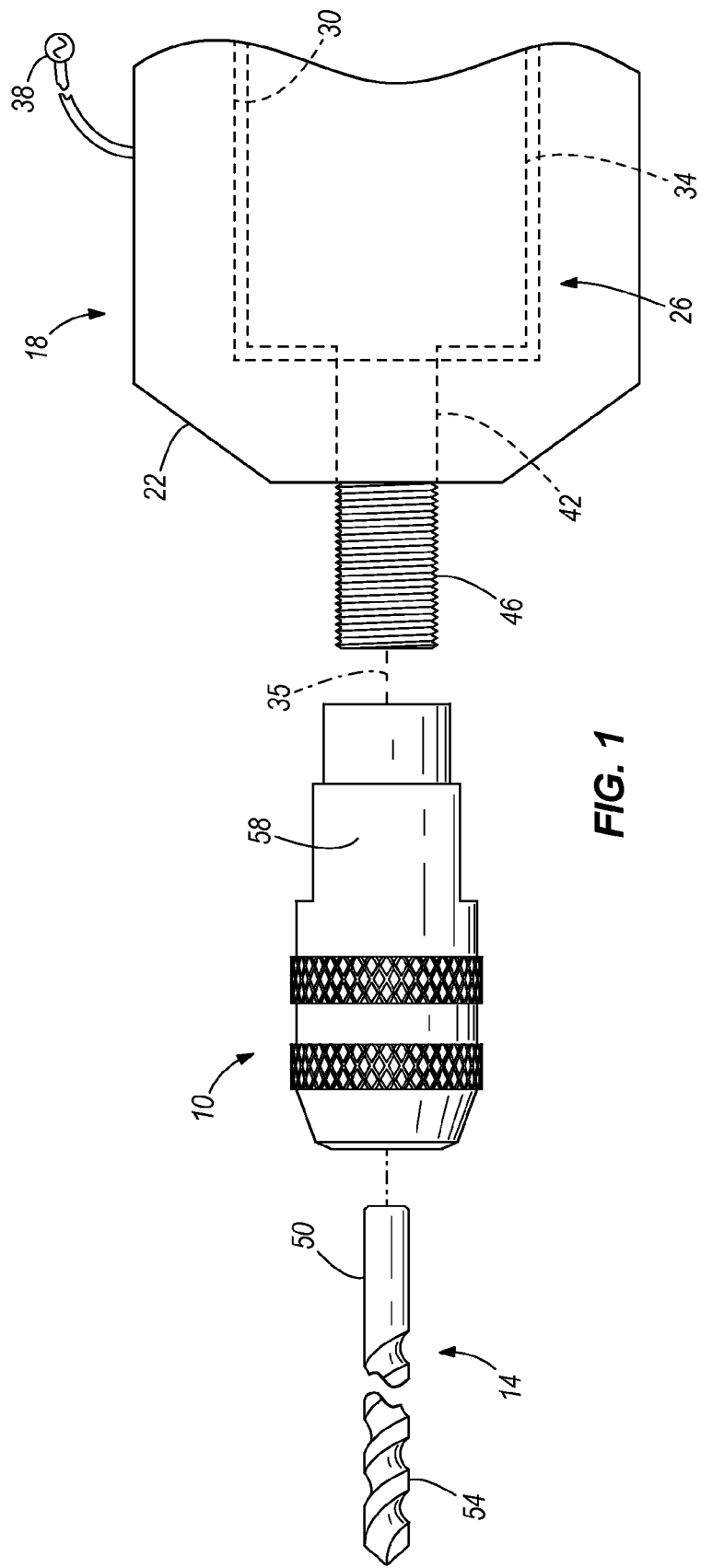
FIG. 1 is a schematic illustration of a collet, a tool bit and a rotary drive.

FIG. 1 illustrates a collet 10 for connecting a rotary tool bit 14 to a rotary tool driver 18. The rotary tool driver 18 can be a drill, powered screwdriver, or other rotatable power tools arranged to drive the rotary tool bit 14. The rotary tool driver 18 includes a housing 22, and a motor 26 disposed substantially within the housing 22. The rotor 34 includes a stator 30 that is fixedly supported by the housing 22 to inhibit rotation of the stator 30 with respect to the housing 22. The rotor 34 is positioned adjacent the stator 30 and is supported for rotation with respect to the stator 30 and in response to the flow of electrical power to the stator 30 and/or rotor 34. In preferred constructions, the rotor 34 is substantially cylindrical and fits within a cylindrical space defined by the stator 30. In other constructions, the rotor 34 is positioned outside of the stator 30 or is spaced axially from the stator 30.

The rotary tool driver 18 can be powered by an AC motor 26 connected to an AC power source 38 such as is shown in FIG. 1. Alternatively, the rotary tool driver 18 can be powered by a DC Motor connected to batteries.

The rotor 34 includes a tool driver shaft 42 that extends along the rotational axis 35 of the rotor 34. The tool driver shaft 42 provides points for rotational support of the rotor 34. In the illustrated construction, the tool driver shaft 42 extends from the housing 22 and includes a threaded portion 46 that receives the collet 10. In other constructions, the tool driver shaft 42 provides input to a gear box or other speed changing arrangement (increasing or decreasing). An output shaft extends from the gear box or speed changing device and out of the housing 22. In these constructions, the output shaft also includes a threaded portion 46 that receives the collet 10. As would be understood by one of ordinary skill in the art, the arrangement used to drive the tool driver shaft 42 is not critical to the invention so long as the shaft extends from the housing and can receive the collet 10.

A portion of the rotary tool bit 14 is illustrated in FIG. 1. The rotary tool bit 14 includes a shank portion 50 and a cutting portion 54 attached to or formed out of the shank portion 50. The cutting portion 54 could include flutes that allow for the boring of an accurately sized bore or for other functions as desired. Thus, any tool that is rotationally driven to cut a workpiece or to function could be the rotary tool bit 14. Generally, the shank portion 50 is cylindrical and has a standard rotary tool diameter. For example, many rotary tools are formed with ⅛ inch (3 mm) diameters while others might be formed with ¼ inch (6 mm) or ⅜ inch (9 mm) diameters. In some constructions, the shank portion 50 includes two or more flats that can aid in connecting the shank portion 50 to a chuck.

Figure 2:
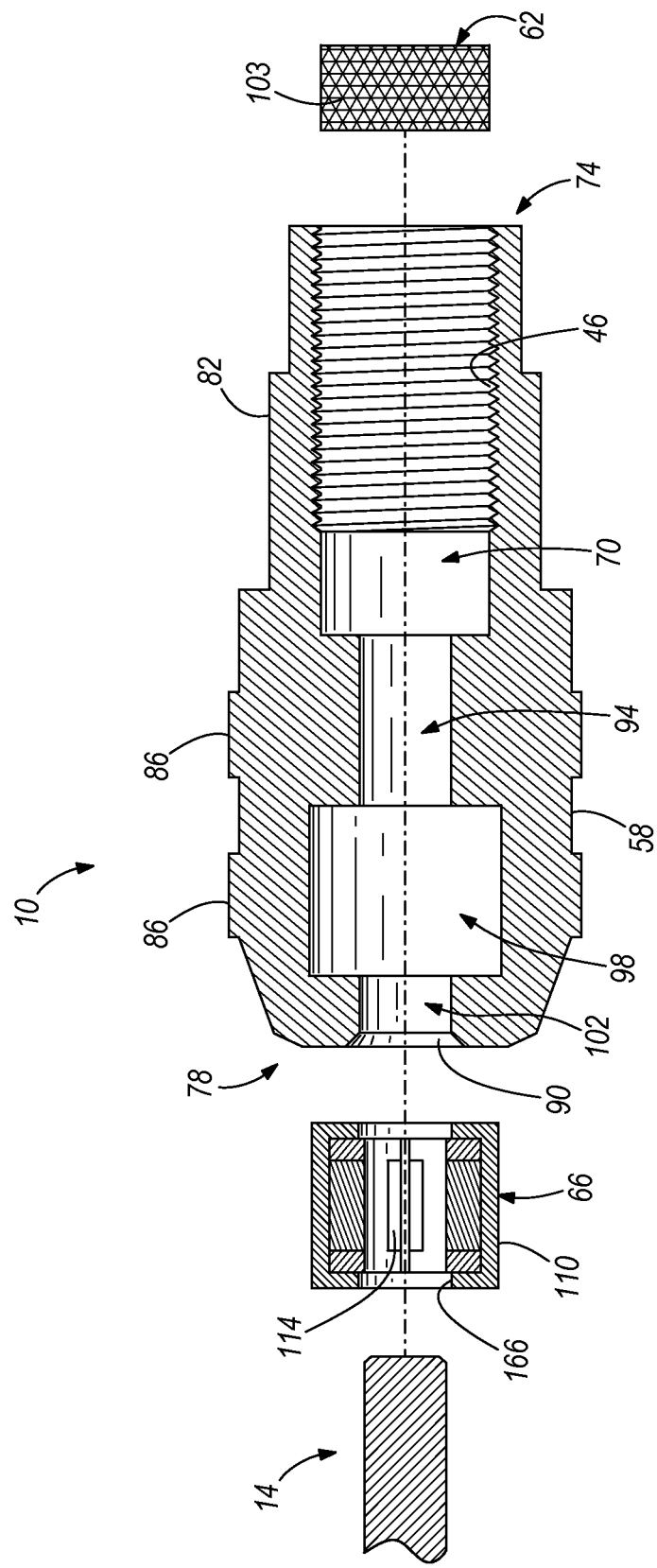
FIG. 2 is an exploded sectional view of a collet suitable for use in the assembly of FIG. 1.

As illustrated in FIG. 2, the collet 10 includes a body 58, an axial restraining member 62 and a radial support member 66. The collet body 58 includes a restraining member space 70, a first end 74, a second end 78, flats 82, and knurled regions 86. The first end 74 is threaded and configured to threadably engage the threaded portion 46 of the rotary tool 18. In this embodiment, the collet 10 and the tool driver shaft 42 are threaded. Alternatively, the collet 10 and the tool driver shaft 42 can be connected by welds, adhesives, a cam mechanism, friction fitting, fastener, and any other suitable coupling means. Thus, the first end 74 can be configured differently to facilitate connection to the tool driver shaft 42.

The second end 78 has an opening (aperture) 90 for receiving tool bits 14, such as screw bits, chisel bits, drill bits (like the one illustrated in FIG. 1), and any other tool bit 14 that can be used with a rotatable power tool 18.

The flats 82 are arranged in pairs that oppose one another such that the two flats 82 in any pair are substantially parallel to one another. The flats 82 are configured for engagement with a hand tool such as different types of wrenches, and pliers. The hand tool engages the collet 10 by grasping the flats 82. The user then turns the hand tool in an effort to secure the connection between the collet 10 and the rotary tool driver 18 or to disconnect the collet 10 from the rotary tool driver 18.

The knurled regions 86 are configured to improve a users grip on the collet 10. When a user grips the collet 10 the knurled regions 86 provide increased friction, thereby allowing a user to install or remove the collet 10 by hand. In the illustrated construction there are two knurled regions 86 with a non-knurled region separating the two. Of course, other arrangements are also possible.

FIG. 2 illustrates an exploded sectional view of the collet 10 to better illustrate the internal components. The collet body 58 includes an interior opening that includes various sized areas. As discussed, the first end 74 includes threads sized and arranged to threadably engage the threaded portion 46 of the tool driver shaft 42. Moving toward the second end 78, the next space adjacent the threaded portion is the restraining member space 70. The restraining member space 70 includes a cylindrical bore sized to receive the axial restraining member 62. In some constructions, the restraining member space 70 includes a feature that restrains or aids in restraining the axial restraining member 62 in the desired position. For example, one construction provides a narrow slot sized to receive a snap ring. Once positioned, the snap ring inhibits axial movement of the axial restraining member 62 out of the body 58 through the first end 74. In still other constructions, the axial restraining member 62 is held in place by the threaded end 46 of the rotary tool driver 18.

The space adjacent the restraining member space 70 is a cylindrical shaft receiving space 94. The shaft receiving space 94 includes a cylindrical bore sized to receive the shank portion 50 of the rotary tool bit 14. An end of the shaft receiving space 94, closest to the first end 74, is abutted by the axial restraining member 62 and/or the restraining member space 70.

The space adjacent the shaft receiving space 94 is a radial restraining member space 98. The radial restraining member space 98 includes a cylindrical bore sized to receive the radial support member 66.

Near the second end 78 and in the space adjacent the opening 90 is a second shaft receiving space 102. The second shaft receiving space 102 includes a cylindrical bore sized to receive the shank portion 50 of the rotary tool bit 14.

The axial restraining member 62 includes a magnet 103 sized to be disposed inside of the restraining member receiving space 70. The magnet 103 is cylindrical in shape with two flat portions designated to be a top and a bottom. The magnet 103 is configured to magnetically engage the shank portion 50 of the rotary tool bit 14 and restrict axial movement toward the second end 78. In preferred embodiments, the magnet 103 is made of rare earths to increase the magnetic engagement between the magnet 103 and the shank portion 50.

The radial support member 66 includes a roller bearing assembly positioned within the collet body 58. In preferred construction, the roller bearing is a one-way locking roller bearing that includes a plurality of rollers 114 supported by a roller cage 110 such that the rollers 114 are substantially free to rotate in a first direction but are inhibited from rotating in an opposite direction. The rollers 114 are positioned to define a bearing inside diameter 106 that is about equal to the diameter of the tool bit 14 intended to be received by the collet 10. In other constructions, other types of one-way bearings may be employed. For example, one-way needle bearings, ball bearings, and the like could be employed in place of or in conjunction with the roller bearing assembly.

FIGS. 3, 4, and 5 illustrate three collet bodies 10a, 10b, 10c arranged to receive three different sized tool bits 14. As can be seen, the apertures 90a, 90b, 90c are each sized to receive a particular size tool bit 14. Each of the collet bodies 58a, 58b, 58c is substantially the same with the exception of the apertures 90a, 90b, 90c. In addition to the apertures 90a, 90b, 90c, each of the one-way locking roller bearings 66 define an inside diameter 106 that corresponds to the particular tool bit 14 being received.

In operation, the collet 10 is threaded on to the end of the tool driver shaft 42. A wrench or another type of hand tool, capable of gripping the flats 82 located on the collet body 58, can be used to tighten the collet 10 onto the end of the tool driver shaft 42. Alternatively, the collet 10 can be hand tightened onto the driver shaft 42. Once the collet 10 is secured onto the tool driver shaft 42 a rotary tool bit 14 can be placed into the collet 10. A rotary tool bit 14 is pushed into the aperture 90 on top of the collet 10 until it contacts the magnet 103. The magnet 103 inhibits further insertion and provides magnetic resistance to the axial removal of the rotary tool bit 14. The one-way locking roller bearings 66 provide mechanical resistance to radial movement of the tool bit 14 and also inhibit rotation of the tool bit 14 in one direction. As the motor rotates the collet 10, the tool bit 14 rotates with the collet 10 and performs the desired work.

Figure 6:
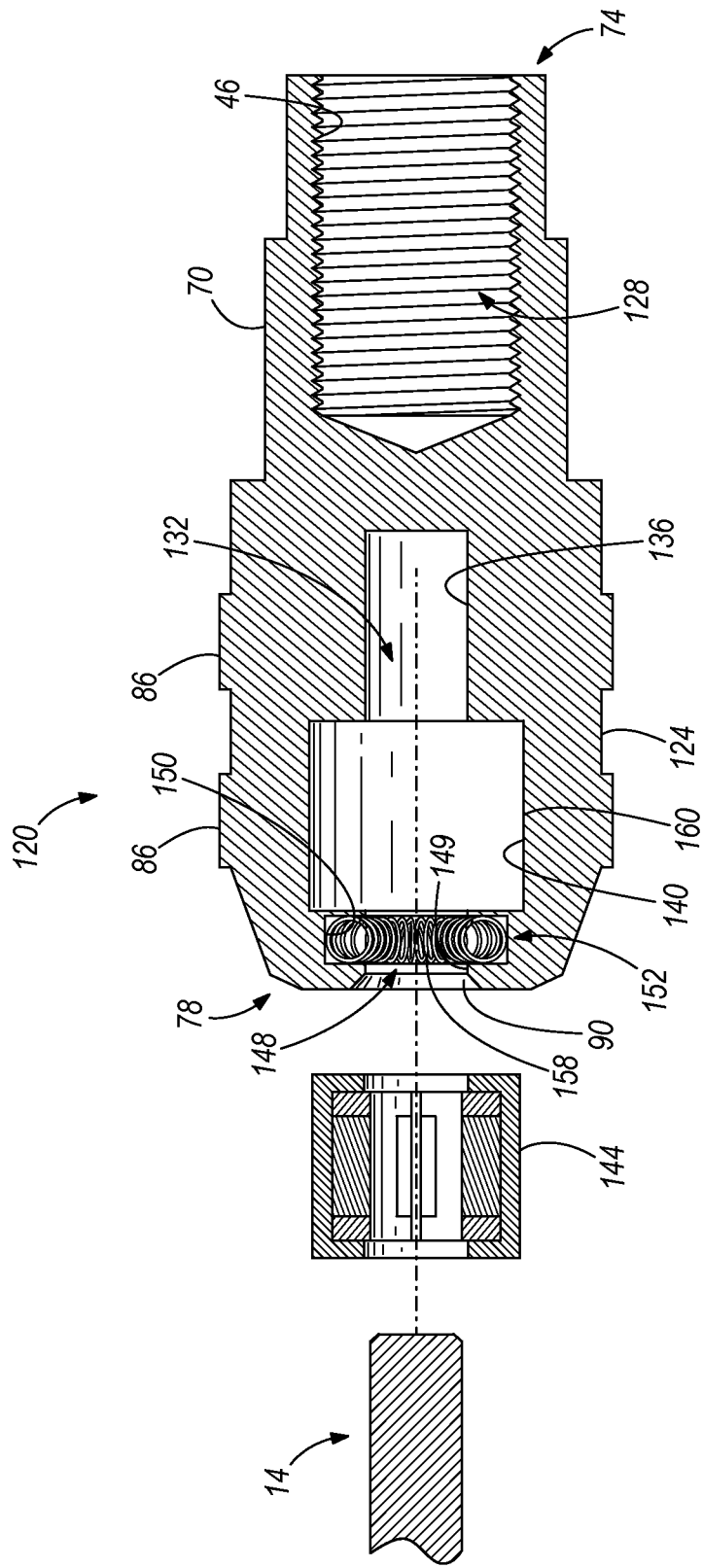
FIG. 6 is an exploded sectional view of another collet suitable for use in the assembly of FIG. 1.

FIG. 6 illustrates another construction of a collet 120 that includes a body 124 having an exterior that is similar to the exterior of the collet 10 of FIGS. 1-5. Specifically, the body 124 includes a first end 74 and a second end 78 similar to those of the collet of FIGS. 1-5. The body 124 also includes flats 82 and knurled portions 86 similar to those of the collet of FIGS. 1-5.

Unlike the body 58 of FIGS. 1-5 which includes a single interior space that extends from the first end 74 to the second end 78, the body 124 of FIG. 6 includes two separate interior spaces. A first space 128 is threaded, much like the threaded portion of the body 58 to receive the rotary tool shaft 42. As with the threaded portion of the body 58, other constructions may use different (non-threaded) arrangements in the first space 128 to connect the collet 120 to a differently-arranged shaft 42.

A second space 132 includes a first bore 136 that is substantially cylindrical and includes a flat or blind end. The first bore 136 has a diameter that closely matches the diameter of the tool bit 14 intended to be held in the collet 120.

A second bore 140 is positioned adjacent the first bore 136 on the side opposite the first end 74. The second bore 140 has a diameter that is larger than the diameter of the first bore 136. The second bore 140 has an axial length and a diameter sized to accommodate a radial support member 144.

A third bore 148 includes a substantially cylindrical portion 149 and an enlarged slot portion 150. The cylindrical portion 149 includes a diameter similar to that of the first bore 136. The slot portion 150 is formed in the cylindrical portion 149 and is sized to receive an axial restraining member 152.

The radial support member 144 is similar to the radial support member 66 of the collet 10 of FIGS. 1-5. The radial support member 144 includes several roller bearings 156 each held within a cage that is sized to fit within the second bore 140. The roller bearings 156 are preferably supported such that they are free to rotate in a first direction but inhibited from rotating in a second direction. The roller bearings 156 cooperate to define an inside diameter that is about equal to the diameter of the rotary tool bit 14 which the collet 120 is intended to support. It should be noted that other constructions could include other bearings such as ball, journal, needle, etc. so long as the bearing supports the rotary tool 14 in a way that inhibits free rotation in at least one direction.

The axial restraining member 152 is positioned adjacent the second end 78 of the body 124 within the enlarged slot portion 150. The axial restraining member 152 illustrated in FIG. 6 includes a canted coil 158. The canted coil 158 is a spring made with slanted or angled coils. The canted coil 158 displaces to allow for the insertion of the rotary tool bit 14 but provides resistance to the removal of the tool 14. The resistance is about proportional to the amount of displacement realized by the canted coils when the tool bit 14 is inserted.

To use the collet 120 of FIG. 6, a user first threadably engages the desired collet 120 to the rotary tool driver 18. To insert a rotary tool bit 14 into the collet 120, the user simply inserts the cylindrical end of the rotary tool bit 14 into the opening 90 of the second end 78. The rotary tool bit 14 contacts the axial restraining member 152 to deflect the canted coils. The rotary tool bit 14 passes through the radial support member 144 and into the first bore 136 where the tool bit 14 eventually contacts the bottom, thereby inhibiting further insertion. The radial support member 144 inhibits radial movement of the tool bit 14 and also engages the tool bit 14 to couple the collet 120 and the tool bit 14 for rotation, thereby allowing the tool bit 14 to perform the desired work. The axial restraining member 152 provides resistance to axial extraction of the tool bit 14 to inhibit the unwanted removal of the tool bit 14 from the collet 120.

Figure 7:
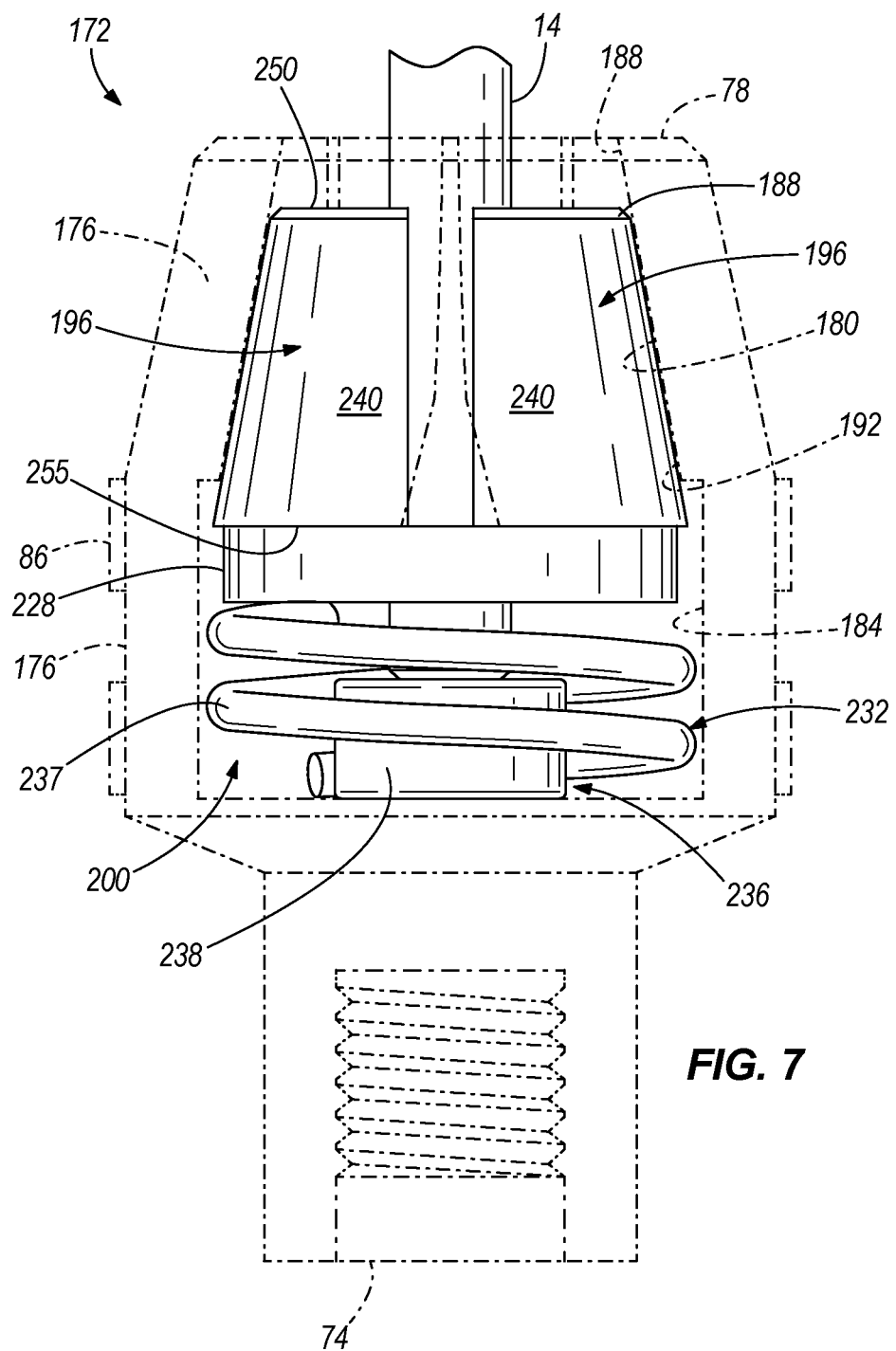
FIG. 7 is a side view of the collet of FIG. 6 with a the housing shown in phantom.
Figure 8:
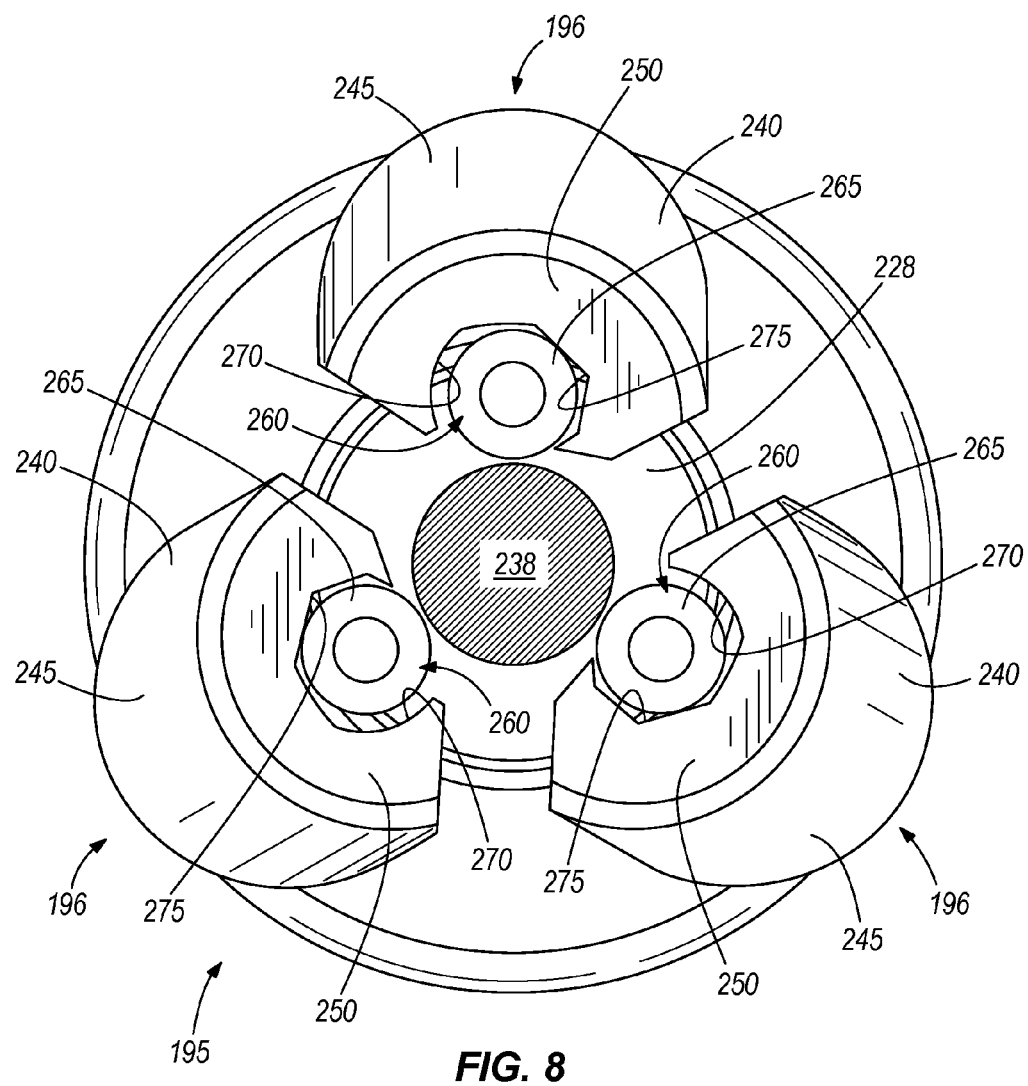
FIG. 8 is a top view of the collet of FIG. 6 with the housing removed.

FIGS. 7 and 8 illustrate another construction of a collet 172 that includes a chuck 195, an axial retaining member 236, and an actuator assembly 200 inside a collet body 176. The collet body 176 includes knurled portions and can include flats as have been described with regard to the collets 10, 120 of FIGS. 1-6. The collet 172 illustrated in FIG. 7 includes a first end 74 arranged to attach to the driving shaft 42. As with other constructions, other arrangements could be employed to attach the collet 172 to the shaft 42.

The collet body 176 includes a second open end 78 that includes a frustoconical portion 180 and a cylindrical portion 184. The frustoconical portion 180 includes a frustoconical bore that includes a small diameter end 188 near the second end 78 and a wide or large diameter portion 192 toward the first end 74. The cylindrical portion 184 includes a cylindrical bore that extends from the large diameter end 192 of the frustoconical bore to a planar bottom surface 194 near the first end 74.

The actuator assembly 200 is disposed at least partially within the cylindrical portion 184 and includes a biasing member 232 and a spacer 228. In the illustrated construction, the biasing member 232 includes a coil spring 237 that biases the spacer 228 in a direction away from the planar bottom surface 194 of the cylindrical portion 184 (i.e., toward the second end 78). In other constructions, other biasing members 232 are employed. For example, one construction employs Belleville washers that cooperate to define a Belleville spring.

The spacer 228 includes a disk shaped annular member that includes a bottom surface and a top surface. The spacer 228 includes a central bore that is sized to allow the passage of the desired tool bit 14. In some constructions, a skirt extends downward around the bottom surface to receive a portion of the biasing member 232 to assure that the biasing member 232 does not slip with respect to the spacer 228. In preferred constructions, the top surface of the spacer is planar.

The axial restraining member 236 includes a magnet 238 similar to that described with regard to the collet 10 of FIGS. 1-5. Thus, the magnet 238 could be a rare earth magnet. The magnet 238 is positioned at the bottom of the cylindrical portion 184 and is surrounded by the biasing member 232.

The chuck 195 includes a number of jaws 196 arranged within the frustoconical portion 180 of the collet body 176. In the illustrated construction, three jaws 196 are employed with other constructions including more jaws 196 or fewer jaws 196. Each jaw 196 includes a body 240 having a frustoconical outer surface 245, a substantially planar top surface 250, and a substantially planar bottom surface 255. The frustoconical outer surface 245 is tapered at an angle similar to that of the frustoconical portion of the collet body 176.

Turning to FIG. 8, each jaw 196 also includes an interior opening 260 and a roller 265 positioned within the opening 260. The opening 260 includes a first curved side 270 and a second hooked side 275. During rotation in a first direction (clockwise in FIG. 8) the rollers 265 shift toward the curved side 270 and allow free rotation of the roller 265 and the tool bit 14. During rotation in the opposite direction (counterclockwise in FIG. 8) the rollers 265 shift toward the second hooked side 275. In this position, the roller 265 wedges within the hooked side 275, is not free to rotate, and is displaced outward slightly. Thus, the rollers 265 do not allow movement of the tool bit 14 with respect to the collet 172. Thus, the single rollers 265 within each jaw 196 act as one way bearings.

To use the collet 172, the user first threadably engages the desired collet 172 to the rotary tool driver 18. The jaws 196 are then pushed downward toward the first end 74 to compress the biasing member 232 and allow the jaws 196 to separate. The tool bit 14 is inserted into the space between the jaws 196, passes through the central aperture of the spacer 228, and contacts the axial restraining member 236. When the user releases the jaws 196, the biasing member 232 displaces upward to move the spacer 228 toward the second end 78. As the spacer 228 moves, the jaws 196, which sit on top of the spacer 228 are forced upward. The frustoconical outer surfaces 245 of the jaws 196 interact with the frustoconical surface of the collet body 176 to move the jaws 196 inward as they move upward. Eventually, the rollers 265 contact the tool bit 14 and the upward movement stops. The biasing member 232 is selected to assure that enough residual force is available to firmly grasp the tool bit 14 between the jaws 196 of the chuck 195. Thus, the construction of FIGS. 7 and 8 is able to hold tool bits 14 having different diameters.

Figure 9:
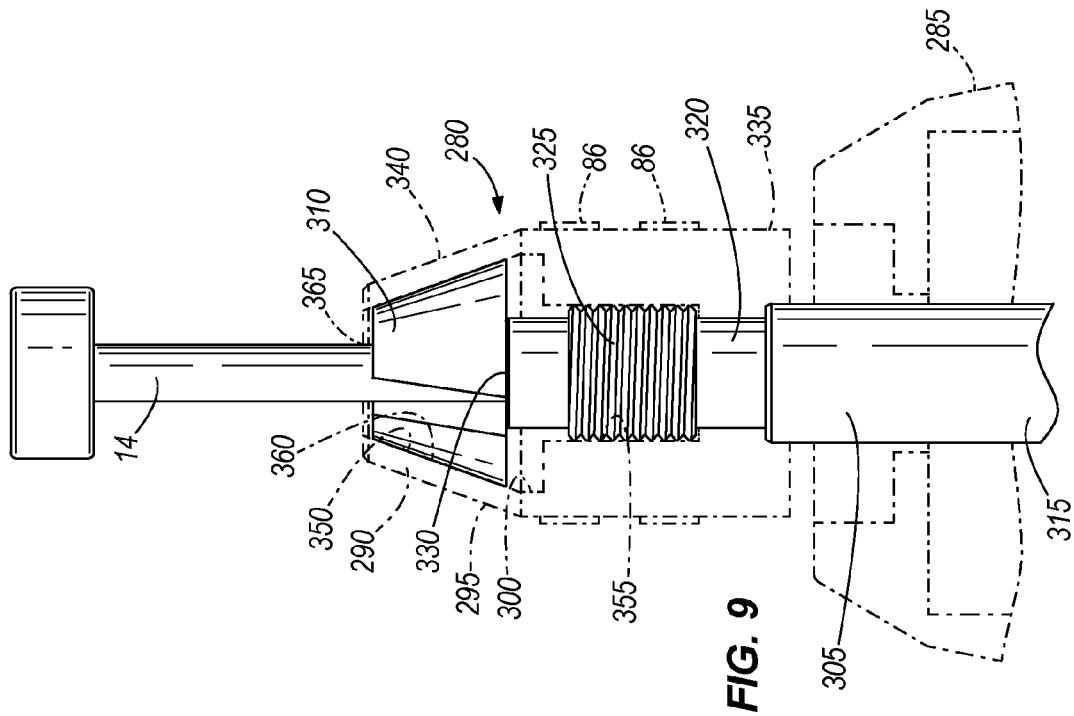
FIG. 9 is a side view of another collet securing a bit while in a resting position, and with the housing shown in phantom.
Figure 10:
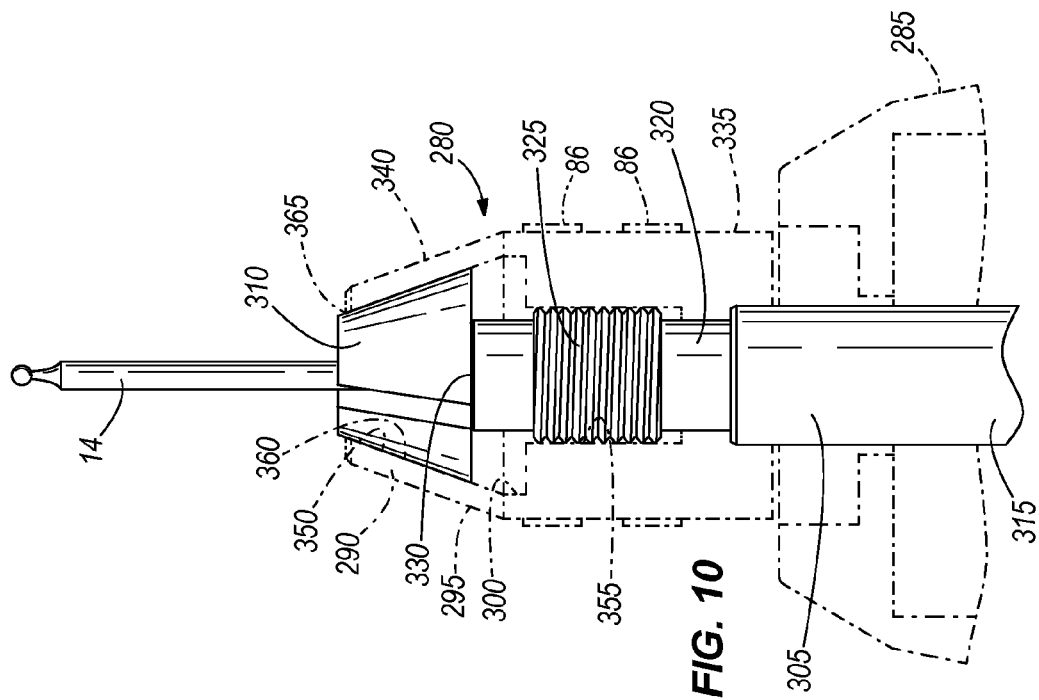
FIG. 10 is a side view of the collet of FIG. 9 securing a bit with the housing shown in phantom.

FIGS. 9-12c illustrate another construction of a collet 280 that operates with a chuck 285 of the power tool 18 to quickly engage a rotary tool bit 14. With reference to FIGS. 9 and 10, the collet 280 includes a body 290 that has an outer surface 295 and an inner space 300, a shaft 305, and a plurality of jaws 310. The jaws 310 are similar to the jaws 196 of the construction of FIGS. 7 and 8.

The shaft 305 includes a first portion 315 that is configured to engage the chuck 285 of the power tool 18. In the illustrated construction, the first portion 315 of the shaft 305 is cylindrical with other shapes being possible. For example, in some constructions a polygonal shaft is employed to improve the connection between the power tool 18 and the shaft 305. A second portion 320 of the shaft 305 includes a threaded portion 325 and a substantially planar end 330.

Figure 11:
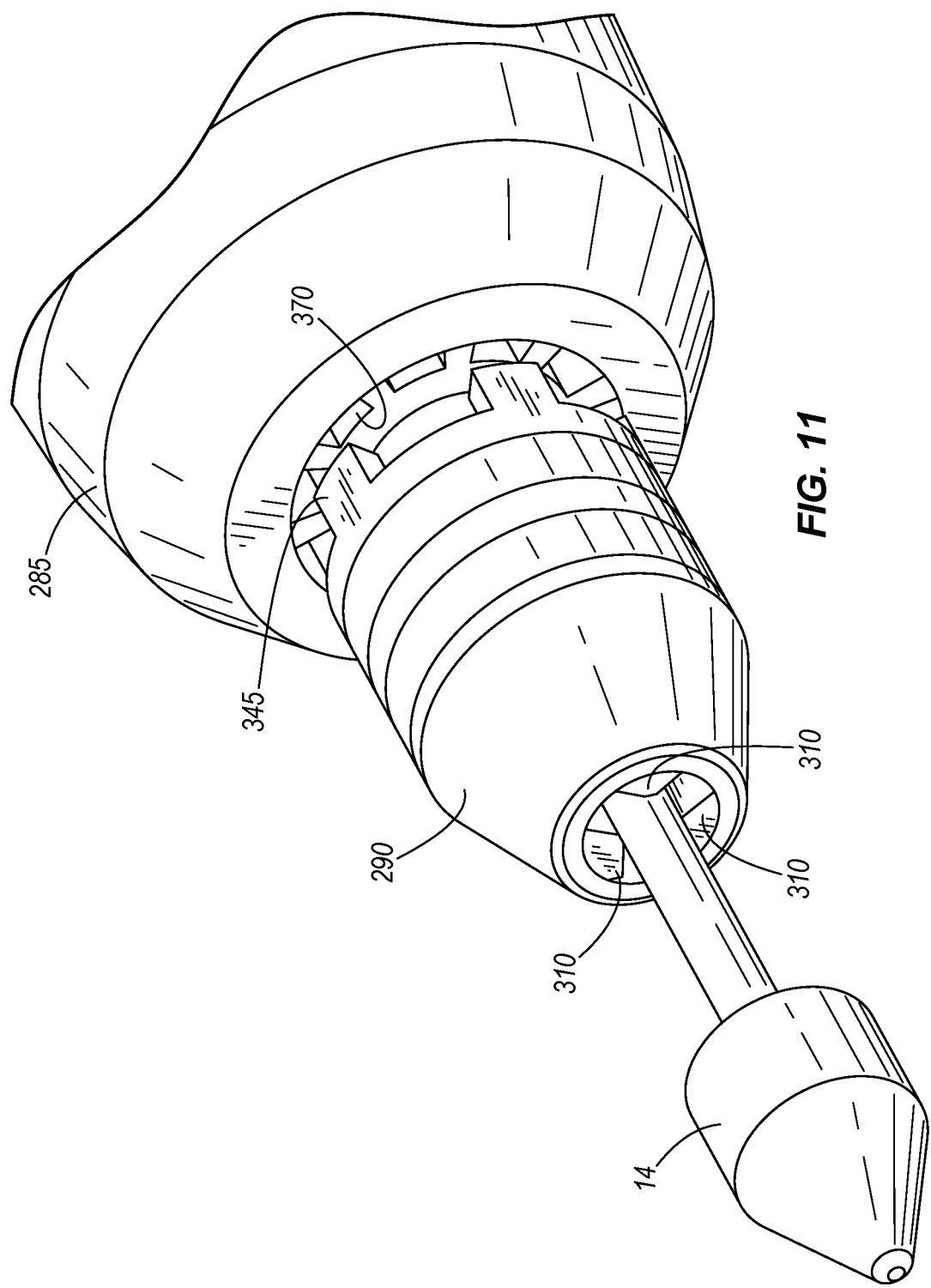
FIG. 11 is a perspective view of the collet of FIG. 9 coupled to a rotary tool driver.

The outer surface 295 includes a cylindrical portion 335 and a frustoconical portion 340. The cylindrical portion 335 may include knurled regions or flats to improve the users grip on the body 290 to facilitate rotation of the body 290. As illustrated in FIG. 11, an end of the cylindrical portion 335 away from the frustoconical portion 340 includes castellated features 345. The castellated features 345 include a plurality of rectangular extensions separated by a plurality of rectangular gaps. In preferred constructions, the rectangular gaps are about the same size as the rectangular extensions. However, other sized gaps could also be employed if desired.

The inner space 300 includes a frustoconical space 350 and a threaded space 355. The threaded space 355 threadably engages the threaded portion 325 of the shaft 305 such that rotation of the body 290 moves the body 290 axially along the shaft 305. The frustoconical space 350 includes a tapered frustoconical surface 360 that is largest near the threaded portion 325 and smallest at an open end 365. The jaws 310 are positioned within the space 350 adjacent the frustoconical surface 360 and are free to move axially between the threaded space 355 and the open end 365.

In use, the collet 280 can receive various rotary tools 14 having a range of shaft diameters. When no rotary tool shaft is positioned in the collet 280, the jaws 310 are free to move toward the threaded portion 325 to leave the largest available opening diameter. The rotary tool shaft 14 is inserted into the space between the jaws 310 until the rotary tool shaft 14 contacts the end 330 of the shaft 305. The body 290 is then rotated. The engaged threaded portions 325 355 act to move the body 290 toward the power tool 18, thereby reducing the space between the threaded portion 325 and the opening 365. The reduced space forces the jaws 310 toward the smaller end of the frustoconical space 350 which forces the jaws 310 closer together until they clamp the rotary tool shaft 14 as described with regard to the construction of FIGS. 7 and 8. In some constructions, a biasing member such as a coil spring is positioned between the jaws 310 and the threaded space 355 to bias the jaws 310 toward the small end 365 of the frustoconical portion 340.

Figure 12C:
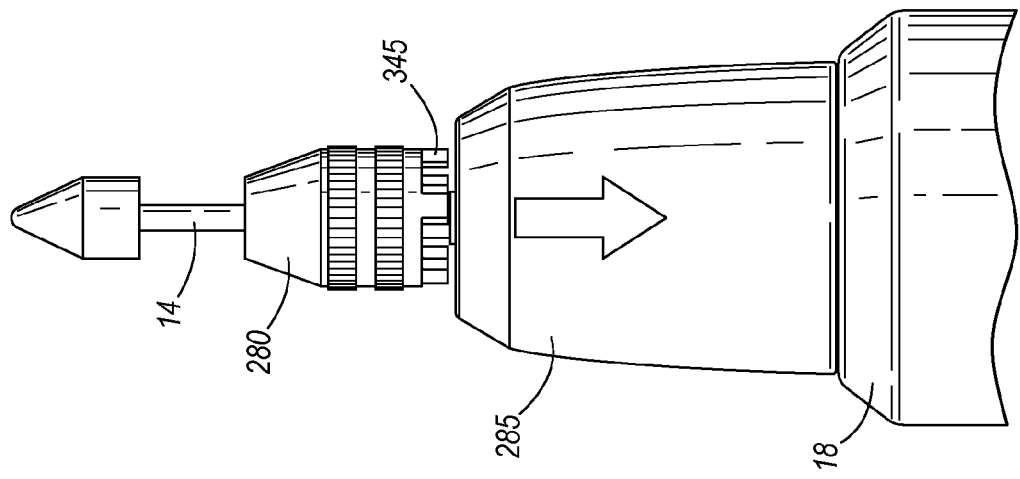
FIG. 12c is a side view of the collet and rotary tool driver of FIG. 11 showing the movement of a rotary tool driver chuck to a disengaged or operating position.
Figure 12B:
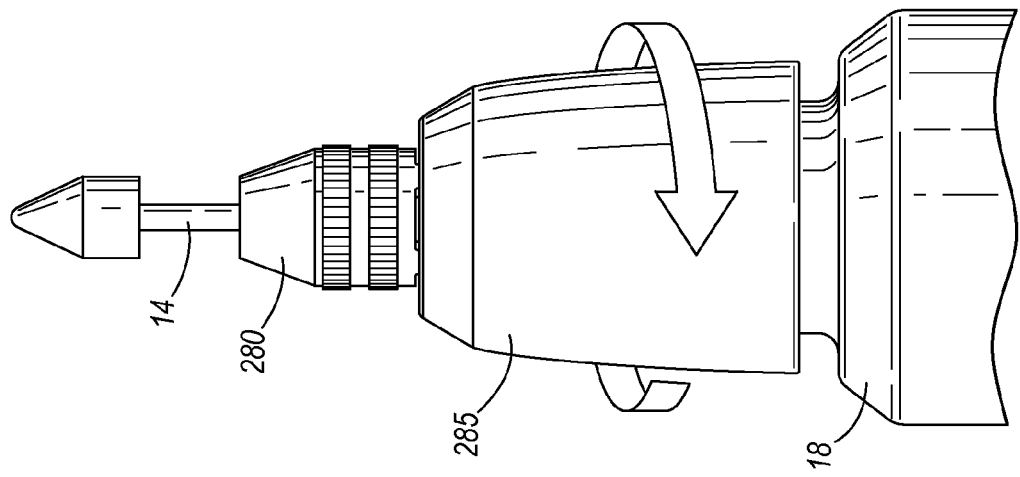
FIG. 12b is a side view of the collet and rotary tool driver of FIG. 11 showing the movement of a rotary tool driver chuck to tighten the collet.
Figure 12A:
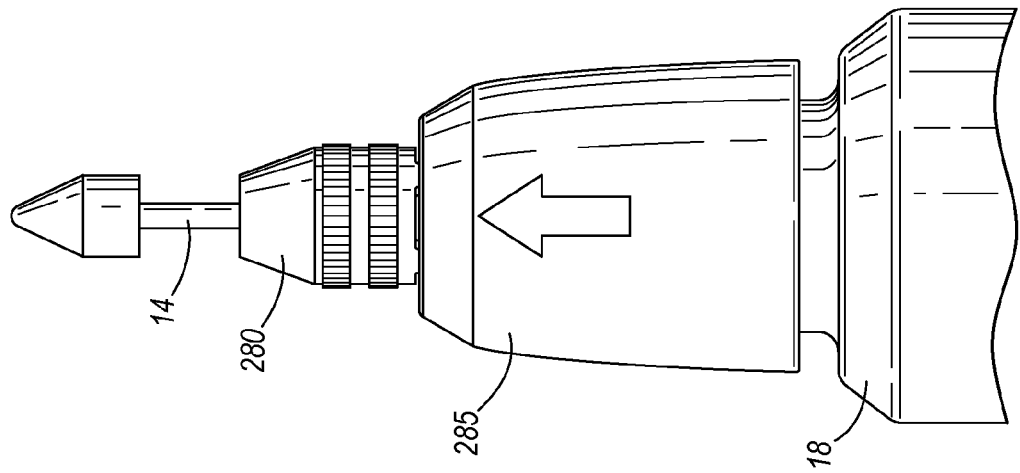
FIG. 12a is a side view of the collet and rotary tool driver of FIG. 11 showing the movement of a rotary tool driver chuck to engage the collet.

The castellated features 345 can be used to aid the user in tightening or loosening the body 290. As illustrated in FIG. 11, the power tool 18 includes corresponding castellated features 370 arranged to receive the castellated features 345 of the body 290. As illustrated in FIG. 12a, the user can move a 285 housing of the power tool 18 toward the body 290 to engage the castellated features 345, 370 as illustrated in FIG. 12b. The user than rotates the chuck 285 to tighten the body 290. The larger size and enhanced gripping features of the chuck 285 allow the user to better tighten and more easily loosen the body 290 as desired. Once tightening or loosening is completed, the user disengages the castellated features 345, 370 as illustrated in FIG. 12c.

In preferred constructions, the chuck 285 is biased toward the disengaged position and automatically returns to that position when the user releases the chuck 285. In other constructions, the body 290 includes a movable portion that moves into engagement with the chuck 285. The movable portion could be biased to the disengaged position if desired.

Various other features and advantages of the invention are set forth in the following claims.

We claim:

1. A collet for connecting a rotary tool to a rotary tool driver, the rotary tool including a shaft having a shaft end and a shaft diameter, the collet comprising:
a body including a first end configured to connect to the rotary tool driver and a second end configured to receive the rotary tool and including a frustoconical bore;
a magnet disposed within the body and positioned to magnetically engage and contact the shaft end to inhibit movement of the rotary tool along a shaft rotational axis;
a support member disposed within the body and configured to support the shaft for rotation about the shaft rotational axis, the support member including a plurality of jaws each including a body having a frustoconical outer surface, each of the frustoconical outer surfaces engaged with the frustoconical bore to move the jaws away from and toward the shaft rotational axis in response to movement of the jaws toward the first end and toward the second end respectively, wherein the plurality of jaws includes a roller supported by the body and operable to engage the rotary tool, and wherein each of the bodies includes an opening adapted to receive the roller, wherein the opening includes a curved side and a hooked side, and wherein rotation of the rotary tool about the shaft rotational axis in a first direction biases the roller toward the curved side wherein the roller and the rotary tool are free to rotate and rotation of the rotary tool about the shaft rotational axis in a second direction opposite the first direction biases the roller toward the hooked side wherein the roller and the rotary tool are inhibited from rotating.

2. The collet of claim 1, wherein the body includes flats configured for engagement with a hand tool and knurled regions configured to improve a users grip.

3. The collet of claim 1, wherein the first end includes threads that threadably engage a threaded shaft of the rotary tool driver.

4. The collet of claim 1, wherein the magnet is a rare earth magnet.

5. The collet of claim 1, further comprising a biasing member positioned between the first end and the plurality of jaws and operable to bias the plurality of jaws toward the second end and toward the shaft rotational axis.

6. The collet of claim 1, wherein the magnet provides the sole support for the rotary tool in a direction along the shaft rotational axis and the rollers provide the sole support to the rotary tool in all directions other than along the shaft rotational axis.

7. A rotary tool driver operable to drive a rotary tool having a tool shaft having a tool end and a shaft diameter, the rotary tool driver comprising:
a housing including a drive end;
a motor supported within the housing and operable to drive a shaft having a shaft end;
a collet body including a first end threadably connected to the shaft end and a second end including an aperture sized to receive the rotary tool shaft and including a frustoconical bore;
a magnet disposed within the collet body and positioned to magnetically engage and contact the tool end to inhibit movement of the rotary tool along a tool shaft rotational axis;
a support member disposed within the collet body and configured to support the tool shaft for rotation about the tool shaft rotational axis, the support member including a plurality of jaws each including a body having a frustoconical outer surface, each of the frustoconical outer surfaces engaged with the frustoconical bore to move the jaws away from and toward the shaft rotational axis in response to movement of the jaws toward the first end and toward the second end respectively, wherein the plurality of jaws includes a roller supported by the body and operable to engage the rotary tool, and wherein each of the bodies includes an opening adapted to receive the roller, wherein the opening includes a curved side and a hooked side, and wherein rotation of the rotary tool about the shaft rotational axis in a first direction biases the roller toward the curved side wherein the roller and the rotary tool are free to rotate and rotation of the rotary tool about the shaft rotational axis in a second direction opposite the first direction biases the roller toward the hooked side wherein the roller and the rotary tool are inhibited from rotating.

8. The rotary tool driver of claim 7, wherein the collet body includes flats configured for engagement with a hand tool and knurled regions configured to improve a users grip.

9. The rotary tool driver of claim 7, wherein the magnet is a rare earth magnet.

10. The rotary tool driver of claim 7, further comprising a biasing member positioned between the first end and the plurality of jaws and operable to bias the plurality of jaws toward the second end and toward the shaft rotational axis.

11. The rotary tool driver of claim 7, further comprising an annular disk disposed between the biasing member and the plurality of jaws.

12. The rotary tool driver of claim 7, wherein the magnet provides the sole support for the rotary tool in a direction along the shaft rotational axis and the rollers provide the sole support to the rotary tool in all directions other than along the shaft rotational axis.

13. A rotary tool driver operable to drive a plurality of rotary tools, each rotary tool including a tool shaft having a tool end and a shaft diameter, the rotary tool driver comprising:
a housing including a drive end;
a motor supported within the housing and operable to drive a shaft having a shaft end;
a collet selectively connectable to the shaft end, the collet including:
a collet body including a first end threadably connected to the shaft end and a second end including an aperture having a frustoconical surface;
a magnet disposed within the collet body and positioned to magnetically engage and contact the tool end to inhibit movement of the rotary tool along a tool shaft rotational axis;
a support member disposed within the collet body and configured to support the tool shaft for rotation about the tool shaft rotational axis, the support member including a plurality of jaws, each jaw including a body having a frustoconical exterior surface and a roller supported by the body, the frustoconical exterior surfaces engaged with the frustoconical surface of the aperture;
a biasing member coupled to the jaws and operable to bias the jaws toward the second end until the rollers engage the tool shaft, wherein each of the bodies includes an opening adapted to receive the roller, wherein the opening includes a curved side and a hooked side, and wherein rotation of the rotary tool about the shaft rotational axis in a first direction biases the roller toward the curved side wherein the roller and the rotary tool are free to rotate and rotation of the rotary tool about the shaft rotational axis in a second direction opposite the first direction biases the roller toward the hooked side wherein the roller and the rotary tool are inhibited from rotating.

14. The rotary tool driver of claim 13, wherein the magnet provides the sole support for the rotary tool in a direction along the shaft rotational axis and the rollers provide the sole support to the rotary tool in all directions other than along the shaft rotational axis.

15. The rotary tool driver of claim 13, wherein the biasing member includes a coil spring positioned between the first end and the plurality of jaws and wherein an annular disk is disposed between the coil spring and the plurality of jaws.

* * * * *